(12) United States Patent
Prestenback et al.

(10) Patent No.: US 8,693,846 B2
(45) Date of Patent: Apr. 8, 2014

(54) SYSTEM AND METHOD FOR DYNAMIC VIDEO PLACEMENT ON A DISPLAY

(75) Inventors: Kyle Prestenback, Burbank, CA (US); Evan Tahler, Burbank, CA (US)

(73) Assignee: Disney Enterprises, Inc., Burbank, CA (US)

( * ) Notice: Subject to any disclaimer, the term of this patent is extended or adjusted under 35 U.S.C. 154(b) by 870 days.

(21) Appl. No.: 12/381,790

(22) Filed: Mar. 16, 2009

(65) Prior Publication Data

US 2010/0231791 A1 Sep. 16, 2010

(51) Int. Cl.
*H04N 9/80* (2006.01)

(52) U.S. Cl.
USPC .......................................... 386/248

(58) Field of Classification Search
None
See application file for complete search history.

(56) References Cited

U.S. PATENT DOCUMENTS

| 7,720,258 B1* | 5/2010 | Ullmann ...................... 382/103 |
| 2008/0188964 A1* | 8/2008 | Bech et al. .................... 700/94 |
| 2009/0115901 A1* | 5/2009 | Winter et al. ................. 348/565 |

* cited by examiner

*Primary Examiner* — Brandon Hoffman
(74) *Attorney, Agent, or Firm* — Farjami & Farjami LLP.

(57) ABSTRACT

There is provided a video playback device for providing adjustable display coordinates and for playing a video on a display. The video playback device comprises a memory storing a plurality of video streams each associated with one of a plurality of different display coordinates and a processor configured to determine a first input display coordinate for displaying the video on the display, select a first coordinate of the plurality of different display coordinates corresponding to the first input display coordinate, and output a first video stream of the plurality of video streams associated with the selected first coordinate on the display.

21 Claims, 4 Drawing Sheets

SYSTEM AND METHOD FOR DYNAMIC VIDEO PLACEMENT ON A DISPLAY

BACKGROUND OF THE INVENTION

1. Field of the Invention

The present invention relates generally to video playback. More particularly, the present invention relates to video placement on a display during video playback.

2. Background Art

Video playback devices, such as Blu-ray players, may sometimes be equipped with the capability of playing a secondary video concurrently on top of a primary video, using a secondary video decoder to provide a "picture-in-picture" feature. This feature can be leveraged to provide, for example, zoomed in details, alternative camera angles or shots, video commentary, or other supplementary video content concurrently with the primary video. For example, audio-only director or cast commentaries can be replaced with more engaging video commentaries, and movie sets might be shown without special effects in the secondary video to allow viewer comparison. Since the secondary video only occupies a small portion of the screen, original content playing as the primary video can still be viewed. By using a remote control or some other input device, a viewer might enable or disable the secondary video in a setup menu accessible before the start of the primary video, or within a pop-up configuration menu.

Unfortunately, due to program limitations inherent in many of these video playback devices, changing placement of the secondary video during playback is often limited or unsupported. This may distract viewers, who are unable to freely move the secondary video to an unobtrusive position of their own choosing to optimize personal viewing conditions. While some video playback devices may allow, for example, placement reconfiguration in a separate setup screen, this placement reconfiguration may require an abrupt stop and restart to any currently playing primary video in the background, inconveniencing viewers by disrupting the flow of playback.

Accordingly, there is a need to overcome the drawbacks and deficiencies in the art by, for example, providing a way to control secondary video with flexible user defined positioning even during playback of primary video on a display.

SUMMARY OF THE INVENTION

There are provided systems and methods for dynamic video placement on a display, substantially as shown in and/or described in connection with at least one of the figures, as set forth more completely in the claims.

BRIEF DESCRIPTION OF THE DRAWINGS

The features and advantages of the present invention will become more readily apparent to those ordinarily skilled in the art after reviewing the following detailed description and accompanying drawings, wherein.

DETAILED DESCRIPTION OF THE INVENTION

The present application is directed to a system and method for dynamic video placement on a display. The following description contains specific information pertaining to the implementation of the present invention. One skilled in the art will recognize that the present invention may be implemented in a manner different from that specifically discussed in the present application. Moreover, some of the specific details of the invention are not discussed in order not to obscure the invention. The specific details not described in the present application are within the knowledge of a person of ordinary skill in the art. The drawings in the present application and their accompanying detailed description are directed to merely exemplary embodiments of the invention. To maintain brevity, other embodiments of the invention, which use the principles of the present invention, are not specifically described in the present application and are not specifically illustrated by the present drawings.

Figure 1:
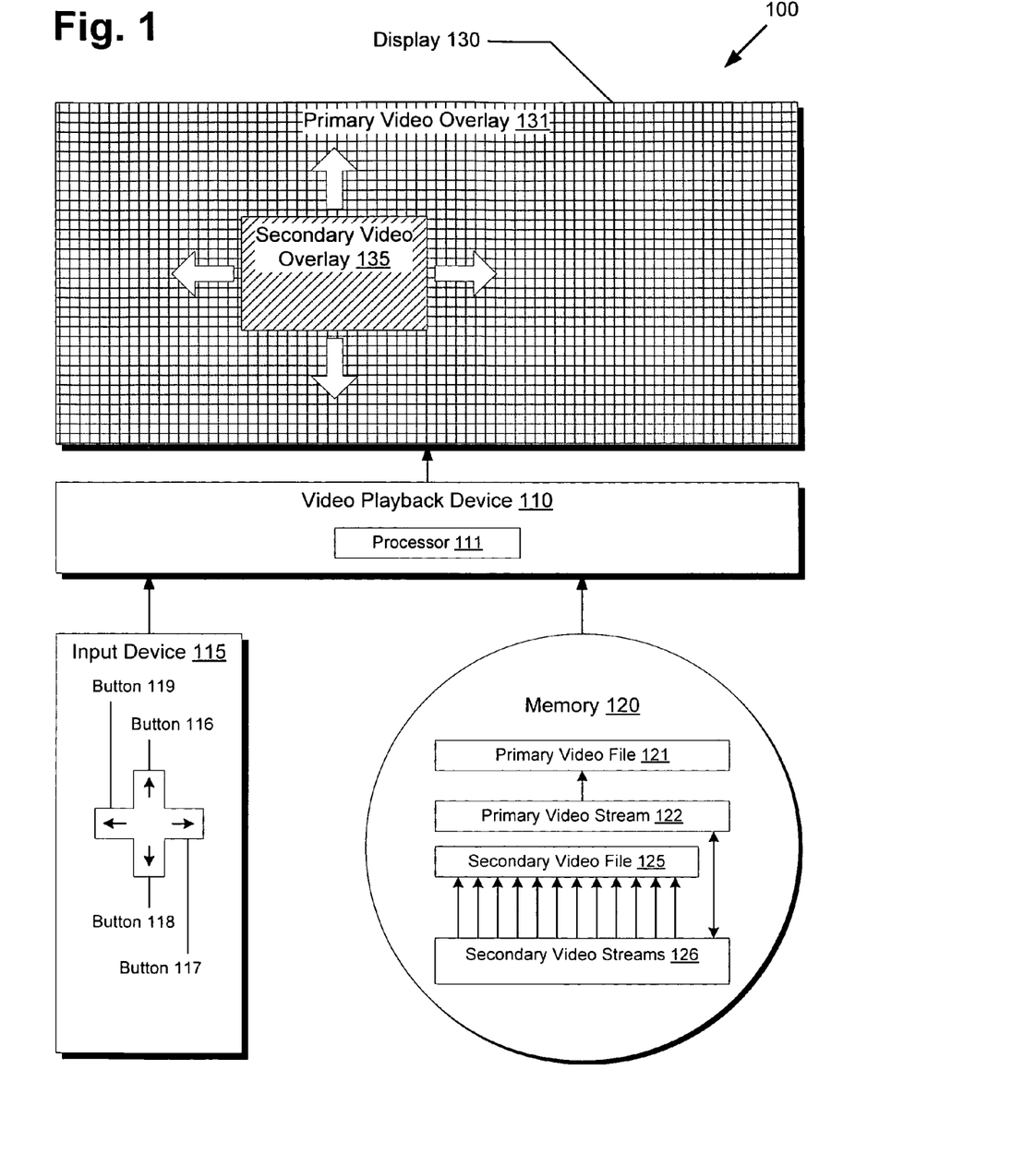
FIG. 1 presents a block diagram of a system for dynamic video placement on a display by video playback devices, according to one embodiment of the present invention.

FIG. 1 presents a block diagram of a system for dynamic video placement by video playback devices, according to one embodiment of the present invention. Environment 100 of FIG. 1 includes video playback device 110, input device 115, memory 120, and display 130. Video playback device 110 includes processor 111. Input device 115 includes buttons 116-119. Memory 120 includes primary video file 121, primary video stream 122, secondary video file 125, and secondary video streams 126. Display 130 includes primary video overlay 131 and secondary video overlay 135.

Video playback device 110 may comprise a number of different embodiments supporting video playback, such as, for example, a standalone DVD-Video player, a videogame console, a Blu-ray Disc player, a desktop computer or notebook computer, a mobile phone, a handheld video game system, or a portable media player. For video output, video playback device 110 may use display 130, which may comprise an integrated component such as an internal liquid crystal display (LCD) screen, or an externally connected component such as a computer monitor, a television, or a high definition television (HDTV). Similarly, input device 115 may be an integrated component, such as an integrated keyboard or touchscreen, or may be an externally connected component, such as an infrared or Bluetooth remote control, or a wireless or wired keyboard or gamepad. As shown in FIG. 1, a user can interact with buttons 116-119 on input device 115 to provide a desired movement direction in four directions. Alternative embodiments might use alternative methods to read user input, such as optical sensors instead of buttons 116-119.

In order to display content, video playback device 110 needs access to media resources, which are stored in memory 120. Memory 120 may comprise, for example, optical media such as a DVD or Blu-ray disc, flash memory, a magnetic hard disk drive, or any other storage media. Besides storing primary video file 121, which could be a feature film, animation, television program, or other recorded content, memory 120 may also store secondary video file 125, which may comprise supplementary picture-in-picture (PIP) content or bonus content separate from the primary video content.

Since primary video file 121 and secondary video file 125 might comprise raw video data, primary video stream 122 and secondary video streams 126 may provide formatted video streams for interpretation by video playback device 110, including extra information such as bit rate, length, video and audio codecs, and other details facilitating video file recognition and playback. As shown in FIG. 1, primary video stream 122 has a one-to-one relationship to primary video file 121, while secondary video streams 126 have a many-to-one relationship to secondary video file 125. In alternative embodiments, secondary video streams 126 might have a many-to-many relationship to several different secondary video files, but for the present example, a many-to-one relationship shall be discussed.

Moreover, the video streams might include additional time code synchronization data for linking related streams together, allowing video stream playback time offsets or time codes to be synchronized. For example, secondary video streams 126 might be specified to be in a synchronous time code mode in relation to primary video stream 122, and vice versa. Processor 111 of video playback device 110 might then detect the presence of this synchronous time code mode to automatically set the time codes of primary video stream 122 and secondary video streams 126 as equivalent during playback, so that secondary video file 125 is synchronized in time with primary video file 121. Alternatively, secondary video streams 126 might be specified to be in an asynchronous time code mode, wherein playback of secondary video streams 126 always begins at a particular time code, such as at the very beginning or at zero seconds. In this case, processor 111 may need to update the time codes of secondary video streams 126 on demand to keep pace with primary video stream 122, thereby ensuring playback synchronization between secondary video file 125 and primary video file 121.

Once video playback device 110 has access to memory 120, processor 111 can utilize primary video stream 122 to display primary video overlay 131 on display 130 and also utilize secondary video streams 126 to display secondary video overlay 135 on display 130. Furthermore, during playback of primary video overlay 131 and secondary video overlay 135, a user can control the position of secondary video overlay 135 via buttons 116-119 on input device 115.

Figure 2:
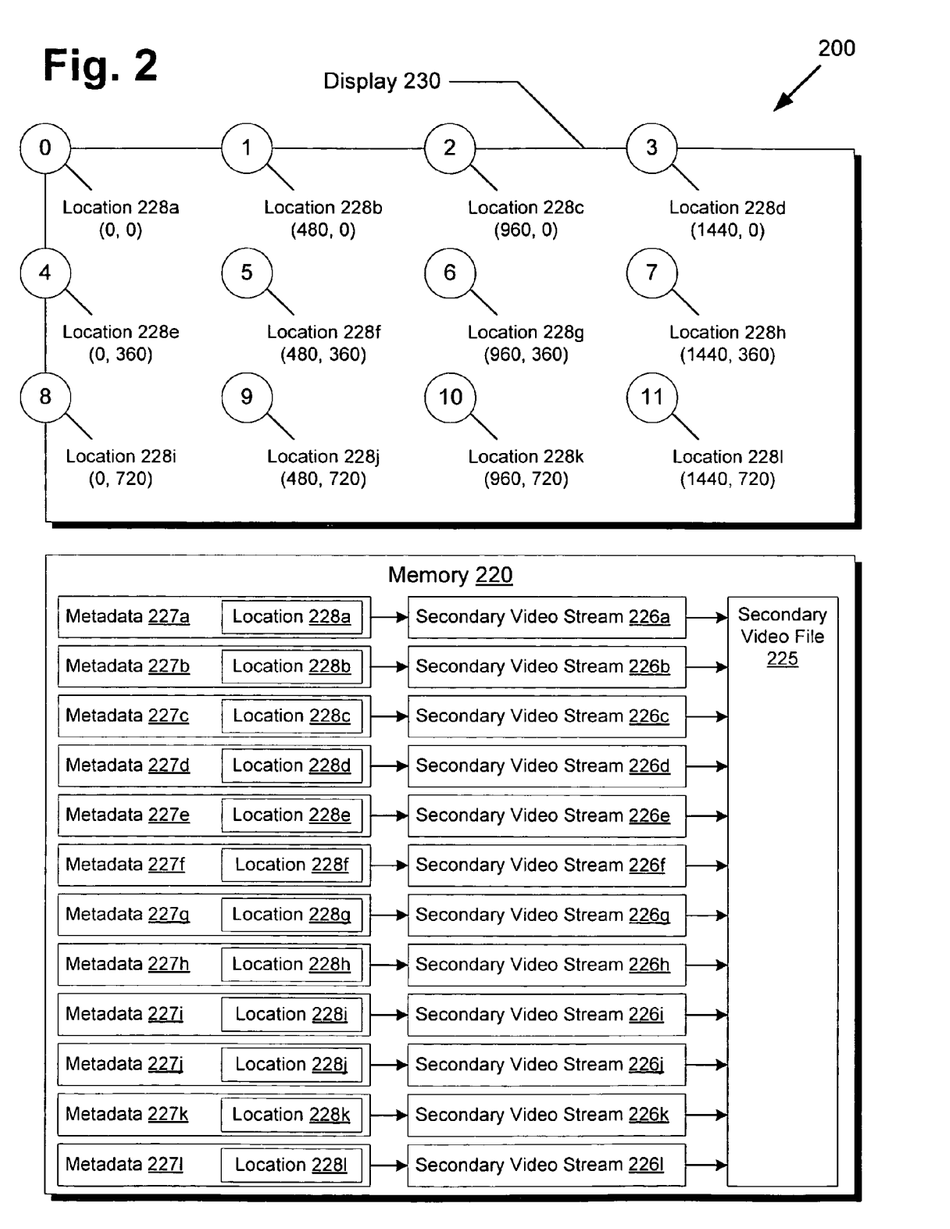
FIG. 2 presents a block diagram of a display and a memory configured for use with a video playback device to provide dynamic video placement, according to one embodiment of the present invention.

FIG. 2 presents a block diagram of a display and a memory configured for use with a video playback device to provide dynamic video placement, according to one embodiment of the present invention. Diagram 200 of FIG. 2 includes memory 220 and display 230. On display 230, locations 228a-228l are illustrated via numbered circles where each circle has a stated (X,Y) coordinate representing the center of the circle. The (X,Y) coordinate system follows a convention where X represents a horizontal position with values increasing to the right and Y represents a vertical position with values increasing downwards, with the upper-left corner of display 230 set as (0, 0). Memory 220 includes metadata 227a-227l, each having location 228a-228l, respectively. Metadata 227a-227l might be stored in memory 220 as individual metadata files, as part of a database structure, or in some alternative data format. Metadata 227a-227l each reference secondary video streams 226a-226l, respectively. Additionally, secondary video streams 226a-226l all reference secondary video file 225. With regards to FIG. 2, it should be noted that memory 220 corresponds to memory 120 from FIG. 1, that secondary video file 225 corresponds to secondary video file 125, that secondary video streams 226a-226l correspond to secondary video streams 126, and that display 230 corresponds to display 130.

As shown in FIG. 2, locations 228a-228l form an evenly spaced grid of positions covering display 230, as supported by data contained within memory 220. For the purposes of the present example, it might be assumed that display 230 has a horizontal resolution of 1920 pixels, and a vertical resolution of 1080 pixels. As shown by the coordinates given in FIG. 2, the twelve locations are separated horizontally in steps of 480 pixels and vertically in steps of 360 pixels. Furthermore, it might be assumed that secondary video streams 226a-226l, when shown on display 230, might comprise videos having resolutions of 480 pixels by 360 pixels. Since the grid covers the whole area of display 230, the user is enabled to freely move a secondary video to a desired position, with the restriction that placement is limited to discrete locations 228a-228l rather than any arbitrary coordinate of display 230. These particular specifications are given as an example only, and alternative embodiments may use different secondary video stream resolutions or display resolutions. Additionally, although only twelve locations are depicted in FIG. 2 for diagram clarity, alternative embodiments may include more locations to provide finer grained pixel stepping between locations, or less locations to provide simplified movement control for the user.

Figure 3A:
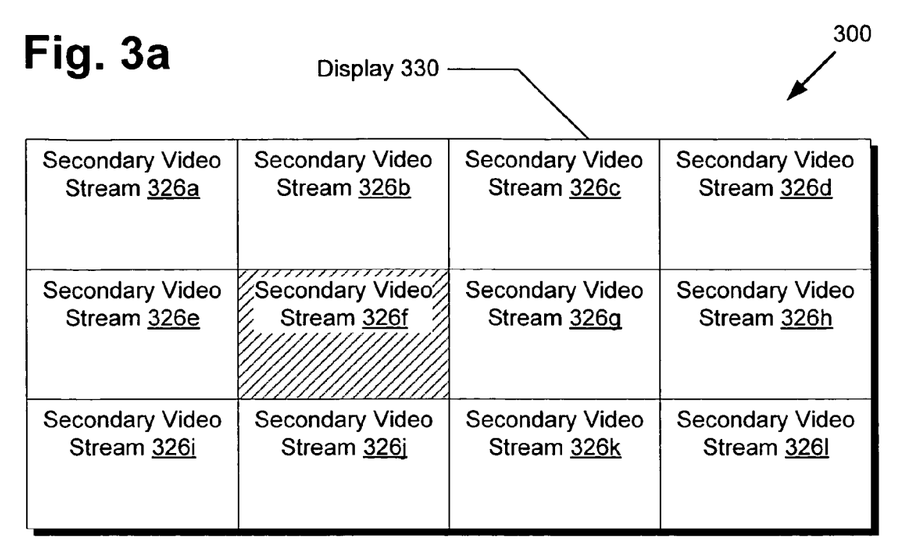
FIGS. 3a-3b present a block diagram of a display for use by a video playback device to provide, for a user, a perception of movement between two secondary video streams, according to one embodiment of the present invention.
Figure 3B:
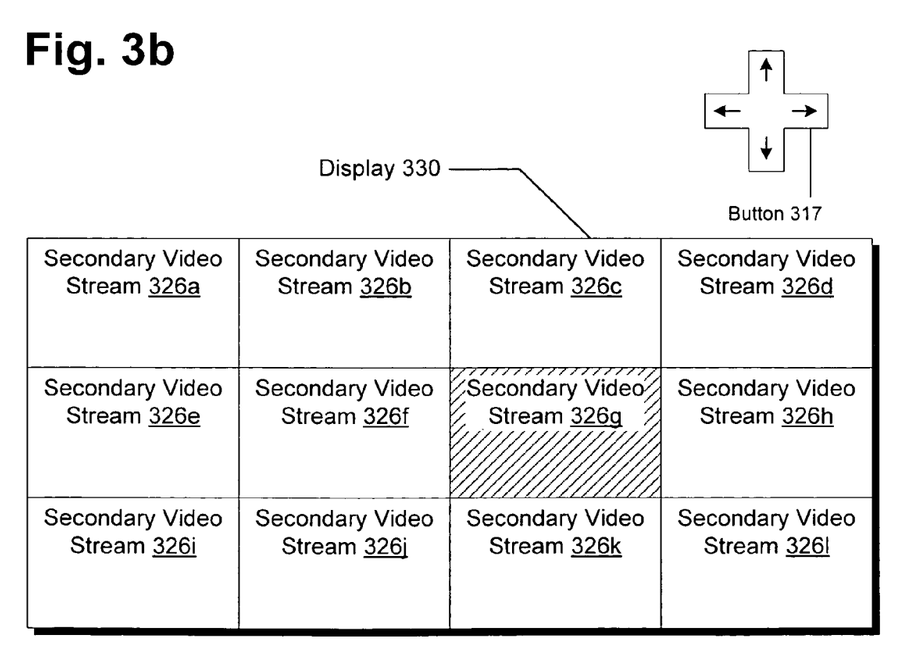

FIGS. 3a-3b present a block diagram of a display for use by a video playback device to provide, for a user, a perception of movement between two secondary video streams, according to one embodiment of the present invention. Diagram 300 includes display 330 and button 317. Display 330 includes secondary video streams 326a-326l. With regard to FIGS. 3a-3b, it should be noted that secondary video streams 326a-326l correspond to secondary video streams 226a-226l from FIG. 2, that display 330 corresponds to display 230 from FIG. 2, and that button 317 corresponds to button 117 from FIG. 1.

As shown in FIG. 3a, locations 228a-228l specified in metadata 227a-227l of memory 220 in FIG. 2 are usable by a video playback device to display secondary video streams 326a-326l at the positions shown on display 330. In some embodiments, multiple secondary video streams may be concurrently playable, but in the present embodiment, only one secondary video stream might be active at a time. In display 330 of FIG. 3a, only secondary video stream 326f may be actively displaying in playback mode, whereas the remaining secondary video streams 326a-326e and 326g-326l may be hidden from display 330, revealing a primary video stream playing below. This may look similar to secondary video overlay 135 overlaid over primary video overlay 131 in FIG. 1. In alternative embodiments, video streams might be presented without overlap if sufficient display area is available, circumventing the need for video overlays. For example, a display having a very wide aspect ratio may have secondary video streams placed to the sides where black bars might usually be situated, allowing unobstructed viewing of both primary and secondary video content. Multiple discrete displays might also be used to display multiple video streams simultaneously.

Moreover, although secondary video streams 326a-326l are shown in rectangular shapes, alternative embodiments might utilize other shapes to provide unique presentations. For example, a star-shaped transparency mask might isolate only a star-shaped portion of secondary video streams 326a-326l, so that the user observes a star-shaped video rather than a rectangular video. Additional graphics layers might also be utilized to provide, for example, decorative frames around the borders of secondary video streams 326a-326l.

After a user presses button 317 indicating movement to the right, display 330 may look like the configuration depicted in FIG. 3b, where only secondary video stream 326g is actively displayed in playback mode. To execute a transition between FIG. 3a to FIG. 3b where a secondary video overlay appears to move right from secondary video stream 326f to secondary video stream 326g, processor 111 of FIG. 1 might terminate the output of secondary video stream 326f and begin output of secondary video stream 326g, updating a time code for secondary video stream 326g if necessary, as previously described.

However, since there are only twelve possible locations for secondary video streams in FIG. 3, transitioning to a new location may appear to the user as a sudden jumping movement that may not be aesthetically desirable. If sufficiently large numbers of secondary video streams are provided to provide a dense grid of possible locations, then a perception of smooth unbroken movement across display 330 can be enabled for the user since distances between different secondary video streams can be reduced. To give one extreme example, if a secondary video stream is provided for every pixel location on display 330, then the user can arbitrarily move the position of the secondary video streams anywhere on display 330, limited only by the resolution of display 330. However, for a typical high definition display, this may require 1,920 by 1,080 or 2,073,600 locations, which may be unwieldy to implement. Since each unique location may require an attendant metadata file and secondary video stream, there may be a practical upper limit to the number of secondary video streams due to file system limitations, memory limitations, processing speed, and other hardware or software considerations.

Thus, as an alternative, a sufficient number of secondary video streams having different locations might be provided such that distances between secondary video streams are minimized to a sufficiently small number of pixels, providing a perception of smooth unbroken movement for the user on display 330. This sufficiently small number of pixels may vary depending on the resolution and size of display 330, rendering correspondence to actual physical distances difficult to extrapolate from pixel numbers alone. However, by assuming a common display size such as a 50" (diagonal) HDTV and a typical resolution such as 1920×1080, the sufficiently small number of pixels might be approximated for a majority of users.

For example, based on user feedback, it might be determined that a 1" distance between secondary video streams is an approximate threshold before movement begins to appear jumpy to users. Thus, to ensure the perception of smooth unbroken movement, a sufficient number of secondary video streams having different locations might be provided such that distances between adjacent locations never exceed 1", assuming a 50" display size and a 1920×1080 resolution. This could be accomplished by, for example, dividing display 330 into a grid of squares with each square having no more than 1" diagonal length. Locations can then be chosen from pixel positions of the grid.

Conversely, fewer locations for secondary video streams may also be used to provide a simplified interface for the user. For example, only four distinct locations might be provided by the secondary video streams, allowing the user to dock the secondary video in one of the four corners of display 330. Although less flexible than allowing the user to arbitrarily place the secondary video anywhere on display 330, restricting placement to only the four corners may be preferred by some users who desire less complexity in configuring video playback.

To create the secondary video streams, standard video authoring software might be used to create an initial secondary video stream as a template. Additional custom tools might be programmed to generate the secondary video streams from the template by modifying the location of the template such that the locations from the pixel positions of the grid are represented in the secondary video streams. Alternatively, these custom tools may be integrated as part of the authoring software, or as a plug-in for the authoring software.

Referring back to FIG. 2, since secondary video streams 226a-226l all point to the same secondary video file 225, in FIG. 3, the video content displayed on secondary video stream 326f and secondary video stream 326g will be identical, since they both refer to the same secondary video file. Thus, no matter where the user decides to move the secondary video overlay on display 330, the same secondary video content will be displayed on secondary video streams 326a-326l. This configuration may be ideal for singular secondary video content that has no relationship to display placement.

Alternative embodiments might have different secondary video streams referencing several different video files, which can be leveraged to provide location based video effects related to display placement. For example, the secondary video streams could comprise a magnified portion of the primary video within a particular area covered by a particular secondary video stream, allowing the user to move a virtual magnifying glass across display 330. This could also be combined with graphics layers and transparency masks, as previously discussed, to provide a magnifying glass graphic hovering over display 330, with each secondary video stream shown in a circular lens frame.

Other embodiments may use different video files to display disparate secondary video content without necessarily having any relation to display placement. For example, video commentaries for staff, cast, and director might be arbitrarily placed in different positions on display 330, enabling the user might to view a particular video commentary using input device 115 of FIG. 1. However, due to increased storage requirements for multiple secondary video files, this technique may be of limited practicality for storage-constrained applications, particularly for long running video segments or large numbers of secondary video streams.

Thus, by configuring a video playback device as described in this application, a user is enabled to dynamically move video on a display via a user input device, even during the playback of other video content. This empowers the user to position secondary video in a location most convenient and unobtrusive for the user, allowing the user to fully enjoy both the primary content and the secondary content without having to interrupt playback or fumble with complicated menus. By providing sufficient numbers of different locations on a display through multiple secondary video streams and metadata to ensure that movement transitions do not exceed a certain distance threshold, an impression of smooth unbroken movement can provide the user with an aesthetically pleasing user interface.

Figure 4:
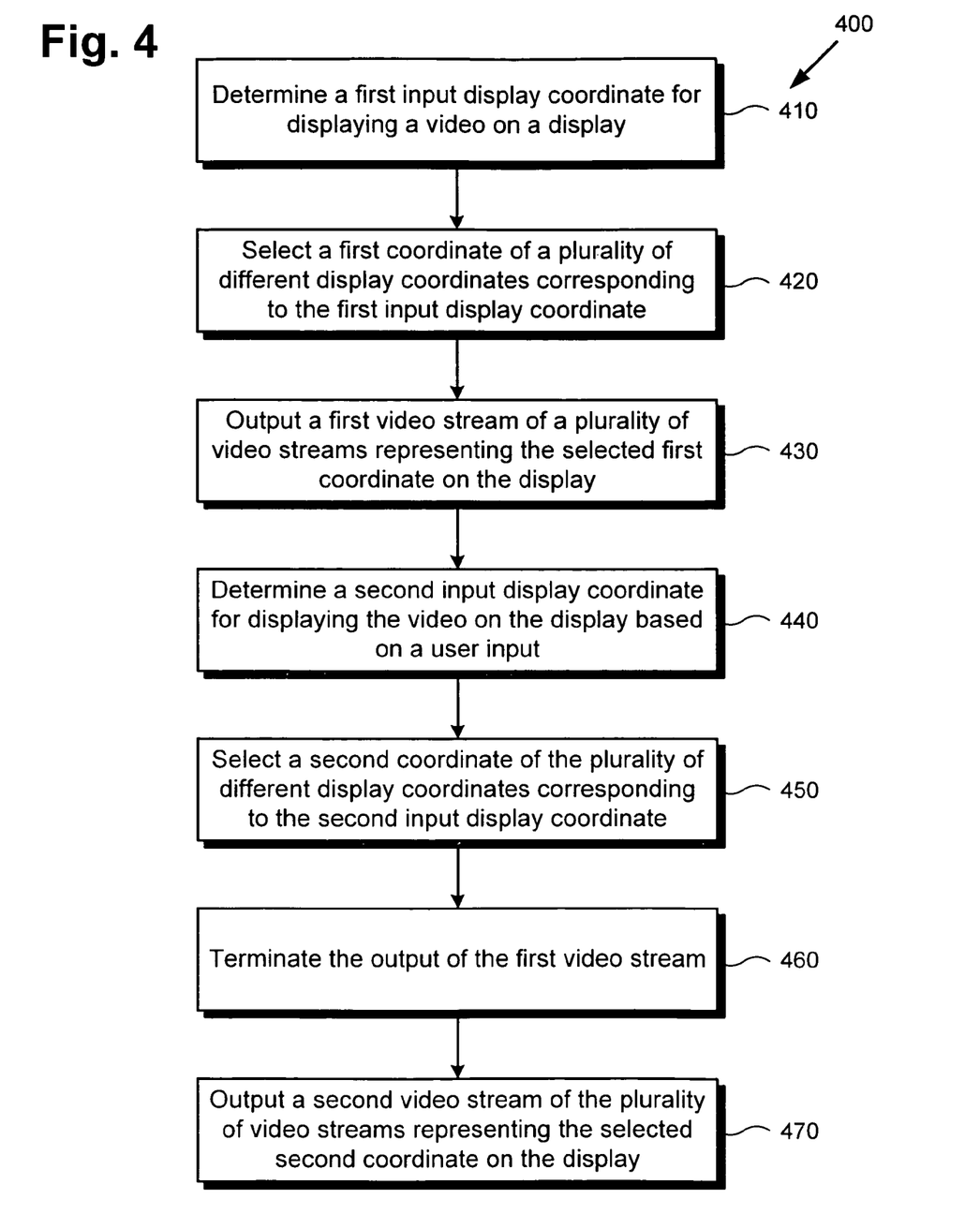
FIG. 4 shows a flowchart describing the steps, according to one embodiment of the present invention, by which a processor of a video playback device can provide dynamic video placement on a display.

FIG. 4 shows a flowchart describing the steps, according to one embodiment of the present invention, by which a processor of a video playback device can provide dynamic video placement on a display. Certain details and features have been left out of flowchart 400 that are apparent to a person of ordinary skill in the art. For example, a step may comprise one or more substeps or may involve specialized equipment or materials, as known in the art. While steps 410 through 470 indicated in flowchart 400 are sufficient to describe one embodiment of the present invention, other embodiments of the invention may utilize steps different from those shown in flowchart 400.

Referring to step 410 of flowchart 400 in FIG. 4 and environment 100 of FIG. 1, step 410 of flowchart 400 comprises processor 111 determining a first input display coordinate for displaying secondary video file 125 on display 130. If no initial input data is provided from input device 115, processor 111 might assign the first input display coordinate a default value. For the present example, this might be assumed to be the display coordinate corresponding to the location of secondary video overlay 135, or (480, 360).

Alternatively, processor 111 might detect a user input from input device 115 to determine the first input display coordinate. For example, if a user decides to trigger button 117 on input device 115 corresponding to a direction of movement directed towards the right, then the first input display coordinate might be determined by applying a rightwards movement from the default position, resulting in the location directly adjacent to the right of the default position, or (960, 360), as shown in FIG. 2. Alternatively, if input device 115 provides independent X and Y coordinates, as might be the case for a pointing device such as a mouse or an aim pointer, then those independent X and Y coordinates might be used for step 410. For the purposes of the present example, it may be assumed that no user input is detected and the default position of (480, 360) is provided in step 410.

Referring to step 420 of flowchart 400 in FIG. 4, environment 100 of FIG. 1, and diagram 200 of FIG. 2, step 420 of flowchart 400 comprises processor 111 selecting a first coordinate from locations 228a-228l corresponding to the first input coordinate from step 410. If processor 111 provides for relative movements via input device 115, then processor 111 can also enforce that step 410 only determine coordinates existing within locations 228a-228l, and step 420 can be completed by selecting an exact matching location.

However, if independent X and Y coordinates are provided in step 410, such as with a mouse or aim pointer, then those independent coordinates might instead be matched to a nearest valid location from locations 228a-228l. In this case, a nearest neighbor algorithm might be used, rather than exact matching. Since step 410 was assumed to provide a position of (480, 360), step 420 shall examine locations 228a-228l and select location 228f as an exact match. If, for example, step 410 had provided (490, 370) instead, then step 420 may apply a nearest neighbor algorithm to determine that location 228f at (480, 360) is the closest to (490, 370).

Referring to step 430 of flowchart 400 in FIG. 4, environment 100 of FIG. 1, and diagram 300 of FIG. 3a, step 430 of flowchart 400 comprises processor 111 outputting secondary video stream 326f representing location 228f on display 330. As previously discussed, a time code of secondary video stream 326f may also be updated here to synchronize with a simultaneously playing primary video stream. Step 430 may be accomplished by sending secondary video stream 326f through a video decoder implemented by processor 111, with metadata 227f specifying location 228f as the position to playback secondary video stream 326f on display 330. Thus, after step 430, secondary video overlay 135 can be seen overlaid on top of primary video overlay 131, which may already be playing in the background via processor 111. As previously discussed, alternative embodiments may have video streams placed side to side or on separate displays as an alternative to video overlays.

Referring to step 440 of flowchart 400 in FIG. 4 and environment 100 of FIG. 1, step 440 of flowchart 400 comprises processor 111 determining a second input display coordinate for displaying secondary video file 125 on display 130 based on user input from input device 115. For example, a user might trigger button 117 by pressing button 117 on input device 115. Processor 111 may then interpret the triggering of button 117 as a direction of movement towards the right.

Turning to FIG. 2, processor 111 may then set the second input display coordinate to (960, 360), or the nearest location adjacent to the right of the first input display coordinate (480, 360). As with step 410, alternative embodiments might read independent X and Y coordinates directly from an input device.

Referring to step 450 of flowchart 400 in FIG. 4, environment 100 of FIG. 1, and diagram 200 of FIG. 2, step 450 of flowchart 400 comprises processor 111 selecting a second coordinate from locations 228a-228l corresponding to the second input coordinate from step 440. As with step 420, if processor 111 provides for relative movements via input device 115, then processor 111 can also enforce that step 440 only determine coordinates existing within locations 228a-228l, and step 450 can be completed by selecting an exact matching location. As previously discussed, if sufficient numbers of secondary video streams with different locations are available, then step 450 can select the second input coordinate such that a distance between the first input coordinate and the second input coordinate is sufficiently small to create, for the user, a perception of smooth unbroken movement on display 330 between FIGS. 3a-3b. Alternatively, if independently derived coordinates are read, then an approximation algorithm such as nearest neighbor matching might be used to match to a nearest location. Since in step 440, the second input display coordinate (960, 360) matches location 228g exactly, no approximation is necessary and location 228g can be selected directly.

Referring to step 460 of flowchart 400 in FIG. 4, environment 100 of FIG. 1, and diagram 300 of FIG. 3b, step 460 of flowchart 400 comprises processor 111 terminating the outputting of secondary video stream 326f initiated in step 430. Processor 111 may halt decoding and playback completely, or may alternatively continue decoding secondary video stream 326f in the background while terminating playback of secondary video stream 326f on display 330.

Referring to step 470 of flowchart 400 in FIG. 4, environment 100 of FIG. 1, and diagram 300 of FIG. 3b, step 470 of flowchart 400 comprises processor 111 outputting secondary video stream 326g representing location 228g on display 330. Step 470 can be accomplished in a manner similar to step 430. Since steps 440-470 may be executed very quickly by processor 111, from the user's perspective, the end result may look similar to a instantaneous transition from FIG. 3a to FIG. 3b, where the secondary video moves towards the right on display 330. By quickly turning off the visibility of secondary video stream 326f and turning on the visibility of secondary video stream 326g, a visual appearance of movement on display 330 can be provided for the user. Steps 440-470 can then be repeated for any further user input from input device 115, enabling the user to freely move secondary video overlay 135 even while primary video overlay 131 continues to playback.

From the above description of the invention it is manifest that various techniques can be used for implementing the concepts of the present invention without departing from its scope. Moreover, while the invention has been described with specific reference to certain embodiments, a person of ordinary skills in the art would recognize that changes can be made in form and detail without departing from the spirit and the scope of the invention. As such, the described embodiments are to be considered in all respects as illustrative and not restrictive. It should also be understood that the invention is not limited to the particular embodiments described herein, but is capable of many rearrangements, modifications, and substitutions without departing from the scope of the invention.

What is claimed is:

1. A video playback device comprising:
a memory configured to store:
a primary video file including a primary video content for providing a primary video stream;
a secondary video file including a secondary video content for providing a plurality of secondary video streams each associated with one of a plurality of display coordinates; and
a processor configured to:
output, on a display, the primary video stream;
receive a first user input of a first display coordinate of the plurality of display coordinates; and
output, on the display at the first display coordinate, a first secondary video stream of the plurality of secondary video streams, wherein the first secondary video stream is associated with the first display coordinate, wherein outputting the first secondary video stream is linked to outputting the primary video stream.

2. The video playback device of claim 1, wherein the memory is further configured to store a plurality of metadata files each corresponding to one of the plurality of secondary video streams and each of the plurality of metadata files specifying one of the plurality of display coordinates, and wherein the processor is further configured to select one of the plurality of display coordinates using one of the plurality of metadata files corresponding to the first display coordinate.

3. The video playback device of claim 1, wherein outputting of each of the plurality of video streams is linked to outputting the primary video stream.

4. The video playback device of claim 1, wherein the memory is further configured to store a plurality of secondary video files, one of which including the secondary video content, and wherein the plurality of secondary video streams each references one of the plurality of secondary video files.

5. The video playback device of claim 1, wherein the first secondary video stream is overlaid on the primary video stream on the display.

6. The video playback device of claim 5, wherein the processor is further configured, during the output of the primary video stream on the display, to update a time code corresponding to a time offset for the first secondary video stream and the primary video stream.

7. The video playback device of claim 6, wherein outputting the first secondary video stream is linked to outputting the primary video stream in a synchronous time code mode, and wherein the processor is further configured, during the output of the primary video stream on the display, to detect the synchronous time code mode to update a time code for the first secondary video stream equal to the time code of the primary video stream.

8. The video playback device of claim 6, wherein outputting the first secondary video stream is linked to outputting the primary video stream in an asynchronous time code mode, and wherein prior to the output of the primary video stream on the display, the processor is further configured to detect the asynchronous time code mode to set a time code of the first secondary video stream equal to a time code of the primary video stream.

9. The video playback device of claim 1, wherein the processor is further configured to:
receive a second user input of a second display coordinate;
select a second coordinate of the plurality of display coordinates corresponding to the second display coordinate; and
output, on the display at the second display coordinate, a second video stream of the plurality of video streams associated with the second coordinate.

10. The video playback device of claim 9, wherein prior to the output of the second video stream, the processor is further configured to terminate the output of the first secondary video stream.

11. The video playback device of claim 10, wherein the processor is further configured to select the second coordinate such that a distance between the first coordinate and the second coordinate is sufficiently small to create, for the user, a perception of smooth unbroken movement on the display between the output of the first secondary video stream to the output of the second video stream.

12. The video playback device of claim 1, wherein the video playback device is a Blu-ray player.

13. The video playback device of claim 9, wherein the user input comprises triggering a button corresponding to a direction of movement on a remote control in communication with the video playback device, and wherein the processor is configured to determine the second input display coordinate by applying the direction of movement to move the first input display coordinate.

14. A method for use by video playback device having a memory and a processor, the method comprising:
obtaining, using the processor, a primary video stream from the memory storing a primary video file including a primary video content;
outputting, on a display, the primary video stream;
receiving, using the processor, a first user input of a first display coordinate of the plurality of display coordinates; and
obtaining, using the processor, a first secondary video stream of a plurality of secondary video streams from the memory storing a secondary video file including a secondary video content for providing the plurality of secondary video streams each associated with one of a plurality of display coordinates;
outputting, on the display at the first display coordinate, a first secondary video stream of the plurality of secondary video streams, wherein the first secondary video stream is associated with the first display coordinate, wherein the outputting of the first secondary video stream is linked to the outputting of the primary video stream.

15. The method of claim 14, wherein the memory includes a plurality of metadata files each corresponding to one of the plurality of secondary video streams and each of the plurality of metadata files specifying one of the plurality of display coordinates, the method comprising:
selecting, using the processor, one of the plurality of display coordinates using one of the plurality of metadata files corresponding to the first display coordinate.

16. The method of claim 14, wherein the outputting of each of the plurality of video streams is linked to the outputting of the primary video stream.

17. The method of claim 14, wherein the memory includes a plurality of secondary video files, one of which including the secondary video content, and wherein the plurality of secondary video streams each references one of the plurality of secondary video files.

18. The method of claim 14, wherein the first secondary video stream is overlaid on the primary video stream on the display.

19. The method of claim 18 further comprising:
updating, during the output of the primary video stream on the display, a time code corresponding to a time offset for the first secondary video stream and the primary video stream.

20. The method of claim 19, wherein the outputting of the first secondary video stream is linked to the outputting of the primary video stream in a synchronous time code mode, and wherein the method further comprises:
detecting, during the output of the primary video stream on the display, the synchronous time code mode to update a time code for the first secondary video stream equal to the time code of the primary video stream.

21. The method of claim 19, wherein the outputting of the first secondary video stream is linked to the outputting of the primary video stream in an asynchronous time code mode, and wherein prior to the outputting of the primary video stream on the display, the method further comprises:
detecting the asynchronous time code mode to set a time code of the first secondary video stream equal to a time code of the primary video stream.

\* \* \* \* \*